United States Patent

Morse et al.

[15] 3,640,438

[45] Feb. 8, 1972

[54] WEB-HANDLING APPARATUS

[72] Inventors: John E. Morse; Norman J. Rosenburgh, both of Rochester, N.Y.

[73] Assignee: Eastman Kodak Company, Rochester, N.Y.

[22] Filed: Mar. 4, 1970

[21] Appl. No.: 16,431

[52] U.S. Cl. ................................226/25, 226/113, 226/183, 226/184, 226/176, 226/190

[51] Int. Cl. ....................................B65h 23/26, G11b 15/28

[58] Field of Search ....................352/159; 74/230.7; 226/25, 226/51, 50, 190, 182, 183, 184, 118, 113, 176

[56] References Cited

UNITED STATES PATENTS 3,084,881 4/1963 Wolf ....................................226/50 X

FOREIGN PATENTS OR APPLICATIONS 735,839 8/1955 Great Britain

*Primary Examiner*—Allen N. Knowles
*Attorney*—Robert W. Hampton and G. Herman Childress

[57] ABSTRACT

Web-handling apparatus has a web drive member for advancing the web past a particular station, such as a film gate of a motion picture projector, a transducer of a magnetic tape transport apparatus, etc. A pair of capstan members for driving the web are symmetrically mounted along a web path at opposite sides of the drive member. Both capstan members are driven simultaneously in a direction for advancing the web toward the drive member, and they are both driven at a speed that exceeds the normal maximum speed or velocity that can be imparted to the web by the drive member so that slippage continuously occurs between the web and the capstan members. The web-handling apparatus can maintain static and dynamic tensions and tension variations in the web adjacent the web drive members at very low levels, thereby avoiding forces that tend to create web damage and avoiding undesired movement of the web at the station that can produce unsatisfactory reproduction of images or other record information on the web. Various embodiments of the capstan devices are disclosed.

25 Claims, 13 Drawing Figures

JOHN E. MORSE
NORMAN J. ROSENBURGH
INVENTORS

BY D. Herman Childress
Robert W. Hampton
ATTORNEYS

JOHN E. MORSE
NORMAN J. ROSENBURGH
INVENTORS

BY [signature]
[signature]
ATTORNEYS

WEB-HANDLING APPARATUS

BACKGROUND OF THE INVENTION

1. Field of the Invention

This invention relates to web-handling apparatus and, more particularly, to such an apparatus for minimizing tension forces and undesired movements of a web with respect to a web drive member. More specifically, the web-handling apparatus of this invention is particularly adapted for use with motion picture projectors and other film-handling apparatus, tape recorders or playback mechanisms, tape scanning devices, and other devices adapted to receive and handle various types of thin elongate flexible strips of web material.

2. Description of the Prior Art

It is known to provide motion picture projectors (and other devices) with a sprocket-type film drive adjacent a film gate to provide a slack loop of film adjacent the gate. Capstan drive mechanisms for web-handling apparatus also are well known, particularly in transport mechanisms for handling magnetic tape or the like. In known transport mechanisms for magnetic tape, the capstan normally is driven in a direction for advancing the tape in one direction at a velocity that is substantially equal to the rotational velocity of the portion of the capstan that engages the tape. Capstan drives have also been used in motion picture projectors or the like as disclosed, for example, in U.S. Pat. No. 1,913,087 to Oehmichen and U.S. Pat. No. 2,762,256 to Gottschalk. In these patents a single capstan drive is provided along the film path and at only one side of a film gate for driving film toward the gate. The film is advanced intermittently through the gate by a claw or other suitable drive member. The mechanisms disclosed in these patents do not provide suitable means at the other side of the gate for dealing with the tension forces on the film at the other side of the gate.

Film-handling portions of motion picture projectors normally subject the portions of the film at each side of the film gate to tension forces that tend to damage the film, produce unsteady projected images, and to create other undesirable affects. For example, in sprocketless projectors it is common practice to drive both the film supply reel and the film takeup reel of a motion picture projector through tendency or friction drives in opposite directions simultaneously for urging the film away from the film gate and onto each of the reels. This is done to take up slack that might otherwise exist between the film gate and the takeup reel and to prevent formation of loose loops of film between the film gate and the supply reel that might otherwise exist as a result of the intermittent motion imparted to the film in the area of the film gate. Even when the supply reel is not driven in the takeup direction during delivery of film from that reel to the gate, the mass of the reel and the film thereon and friction oppose advancement of film from the supply reel to the gate, and that results in undesirable fluctuating tension forces on the portion of the film between the supply reel and the gate. Also, tension forces adjacent a film gate are particularly great during high-speed projection (e.g., 54 frames per second) and this previously has prevented instantaneous reversing of the direction of film movement at such high speeds.

SUMMARY OF THE INVENTION

Accordingly, it is an object of the invention to overcome the disadvantages of the prior art noted hereinbefore and, more specifically, to minimize web tension forces and tension variations in a web adjacent to a station, such as a film gate or the like.

Another object of the invention is to provide an improved web-handling apparatus wherein the tension forces adjacent a station are minimized as the web is advanced past the station.

Another object of the invention is to provide an improved film-handling apparatus for a motion picture projector or the like wherein film can be advanced intermittently by a claw at a relatively high cycle frequency (e.g., 54 frames per second), and wherein the direction of movement of the film can be reversed substantially instantaneously even at such high film speeds without tearing or otherwise damaging the film.

A still further object of the invention is to provide improved capstan drive means suitable for use with web-handling apparatus of various types.

In accordance with the present invention an improved web-handling apparatus is provide for moving a length of web material past a station along a web path from a web supply to a web takeup. The apparatus includes two capstan drive means mounted along the web path at opposite sides of the station and having rotatable members engageable with the web for simultaneously driving the web toward the station from each side of the station. Preferably each of the rotatable members are driven at an angular velocity that exceeds the maximum linear velocity of the web at the station. The invention further comprises improved embodiments of capstan drive means and various associated means for controlling the drive between the capstan and the web.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENTS

Figure 1:
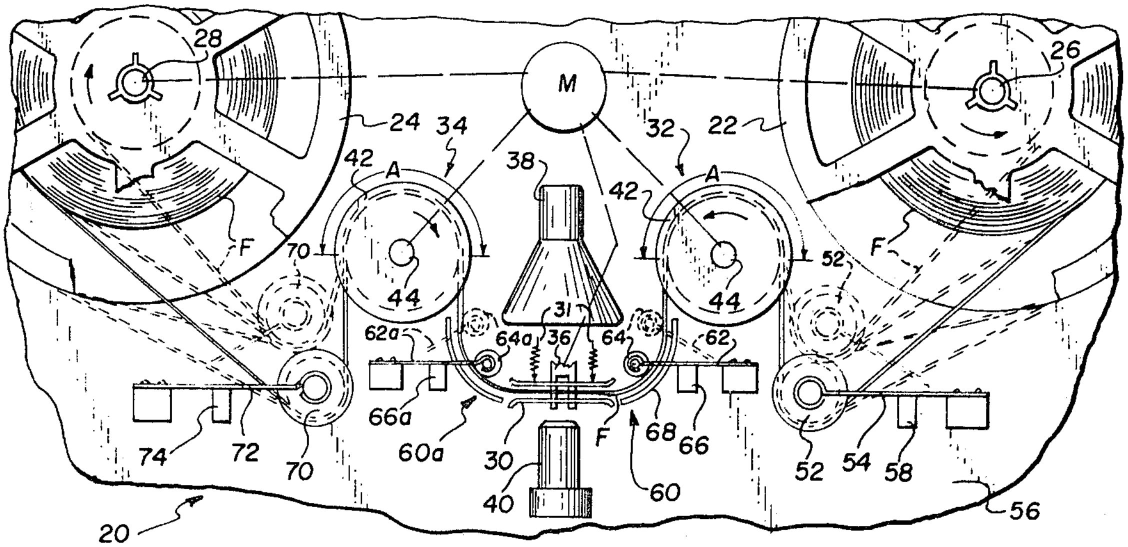
FIG. 1 is a view illustrating portions of a motion picture projector or the like incorporating web-handling apparatus of the invention.

Because web-handling apparatus are well known, the present description will be directed in particular to elements forming part of, or cooperating more directly with, the present invention, and elements not specifically shown or described herein are understood to be selectable from those known in the art.

Referring now to the drawings, and to FIGS. 1 and 2 in particular, the present invention is illustrated and will be described in connection with a motion picture projector generally designated 20 that comprises a supply reel 22 for motion picture film F and a takeup reel 24 for the film. The supply reel is mounted on a spindle 26 that is normally driven by a tendency or friction drive in the takeup (counterclockwise) direction as indicated by the arrow for urging reel 22 in a direction for taking up film onto that reel. The tendency or friction drive allows the reel to be rotated in an unwinding (clockwise) direction during removal of film from the reel by the projector drive mechanisms described hereinafter. The takeup reel 24 is mounted on a spindle 28 an is normally driven through a tendency or friction drive in the takeup (clockwise) direction as indicated by the arrow so that slack is continually taken out of the portion of the film between reel 24 and the projector drive mechanisms. Tendency drives for spindles are well known in the motion picture projector art and, accordingly, will not be described in detail here. As previously indicated, reel 22 may be free wheeling when film is being withdrawn from the reel.

The film travels along a film path between reel 22 and reel 24. Along the film path are a film gate 30 and two substantially identical and symmetrically mounted capstan drive means 32 and 34 of the invention. Gate 30 may comprise two spaced members biased toward each other by spring means diagrammatically shown at 31. A claw 36 located adjacent the film gate intermittently advances film through the gate either from the supply reel to the takeup reel or in the reverse direction. Because the projector mechanism of this invention is capable of operation for advancing film in either direction with equal facility, the terms "supply reel" and "takeup reel" are used as a matter of convenience, and each may be used with equal accuracy for designating either reel. As shown diagrammatically in FIG. 1, spindles 26, 28 and claw 36 are driven from a motor M or other suitable power source.

The projector has a light source 38 which directs a beam of light through a portion of film F in the film gate toward a lens system 40 that focuses an image onto a screen or the like. A suitable shutter mechanism (not shown) is provided along the light path for blocking projection of light through the lens system while film is being advanced through the gate.

The capstan drive means 32 of this invention comprises a rotatable film-engaging drive member shown as a pulley 42 mounted on a spindle 44 that is driven from motor M in the direction indicated by the arrow. As best shown in FIG. 2, pulley 42 comprises a pair of facing frustoconical drive surfaces 46 and 48 having their inner and outer portions separated by distances that are respectively less than and greater than the width of the film F that is to be handled by the projector so that when the filmstrip is wrapped partially around the pulley 42, the edge portions of the film are engageable with an intermediate substantially circular part of surfaces 46 and 48. Thus, the pulley normally engages only the side edges of the film and not on the image-bearing central portions of the film. The inherent stiffness of the film usually prevents collapse of the filmstrip when it is in contact with the pulley. When web material of a more flexible type is handled by a capstan drive member as shown in FIG. 2, or when the forces acting on the film are unusually great, the central, generally cylindrical portion 50 of the pulley between surfaces 46, 48 can be of a diameter that locates it closely adjacent to the inner surface of the web being handled, thereby to support the portion of the web between the edges of the web.

Surfaces 46 and 48 each define an angle X with a plane P extending through film F substantially perpendicular to the film. When the drive surfaces are spherical (as described later in connection with FIGS. 7 and 8) the angle X is defined by plane P and a tangent to the drive surface at the line of contact between the film and the drive surface. The driving force exerted by the capstan drive pulley against film F is a function of the size of angle X since a change in angle X changes the effective coefficient of friction between the film and surfaces 46 and 48. A reduction in the angle X increases the pressure between the film and surfaces 46 and 48, thereby increasing the tangential drive force exerted by surfaces 46 and 48 against the film. Conversely, an increase in angle X reduces the effectiveness of the driving force between the pulley and film F. For the purpose of this discussion, the gain of a capstan can be defined as the ratio of the tension forces in the film portions on the low-tension and high-tension sides of the capstan, such forces being designated $T_1$ and $T_2$, respectively. Thus the capstan gain can be determined or regulated for a particular web-handling apparatus by proper selection of the angle X of the pulley member.

The pulley 42 is located along the film path so that the film is wrapped at least partially around the pulley, the extent of the wrap being designated in the drawings by the angle A which, as illustrated, is substantially 180°. As will be discussed in more detail later, the extent of the wrap angle can be varied in order to modify the driving connection between the capstan pulley 42 and the filmstrip. Because the capstan 34 is substantially identical to capstan 32 the same reference characters have been used to designate the same or similar parts. The capstan pulleys 42 are driven simultaneously in opposite directions as shown by the arrows so that each of the capstans tends to feed film toward gate 30. Pulleys 42 preferably are driven at a peripheral speed that exceeds the maximum velocity at which the film can be driven by claw 36 so that continuous slippage occurs between each of the pulleys and the film. The capstans each act as a web tension amplifier and therefore may be used as feedback or servocontrol mechanisms for maintaining automatically a low-tension film loop at the film gate, for controlling tension forces in the film at the gate, etc., even when relatively large static and dynamic loads and load variations are encountered during operation of the projector.

A float roller 52 can be provided along the film path between reel 22 and capstan 32. The roller is rotatably supported at one end of an arm 54 that is movably connected at its other end to a projector mechanism or support plate 56. Arm 54 can flex upwardly from the position shown in solid lines toward the position shown in dotted lines in response to increases in tension force encountered by that portion of the film between capstan 32 and reel 22. Arm 54 is preferably formed of a spring material or is spring biased downwardly (as viewed in FIG. 1) so that it tends to return to its solid line position when permitted to do so by film tension. Roller 52 may have an undercut central portion for receiving the film, and to avoid contact between the roller and the image-bearing portion of the film the undercut portion of the roller 52 may be shaped as shown in FIG. 2 for pulley 42. A stop 58 can be provided on plate 56 for limiting downward movement of arm 54 and roller 52.

Loop sensing means generally designated 60 may be provided between capstan 32 and film gate 30. The sensing means illustrated in FIG. 1 comprises a flexible spring arm 62 rotatably supporting at one end a film guide roller 64 and mounted at its other end on plate 56. A stop 66 is preferably provided on plate 56 for limiting downward movement of the arm. Film F is threaded between roller 64 and a curved, stationary film guide 68 projecting upwardly from plate 56 adjacent to gate 30. When film is advanced through gate 30 by claw 36, the film engages roller 64 and forces it upwardly against the spring bias of arm 62 thereby increasing the tension force ($T_1$) in the segment or portion of the film between capstan 32 and gate 30, such segment being the low-tension side of the film with respect to capstan 32. The segment of film on the other side of capstan 32 is referred to as the high-tension side of the film (with respect to capstan 32), and the tension force in the high-tension side is designated $T_2$. In operation, capstan 32 maintains a constant ratio $T_1/T_2$, and drives film toward gate 30 when there is an increase in force $T_1$ beyond a predetermined design value. Conversely, if $T_1$ falls below a specific design value, as will occur when claw 36 drives film toward capstan 32, then film slips around capstan 32 toward roller 52 and is taken up onto reel 22 until the design ratio of $T_1/T_2$ is restored.

A second loop sensing means generally designated **60*a* is provided between the gate 30 and capstan 34. The structure of the sensing means 60*a* is the same as sensing means 60 and, accordingly, the reference numerals used are the same as for means 60** except the subscript *a* has been added to each numeral.

Along the film path between capstan 34 and takeup reel 24 there is a float roller 70 mounted on one end of a spring arm 72, the other end of which is secured to plate 56. A stop 74 may be provided for limiting downward movement of the arm. Film F is trained around roller 70. The construction, mounting and operation of roller 70 is substantially identical to that described hereinbefore in connection with roller 52.

Operation of the projector shown in FIGS. 1 and 2 will now be described. Claw 36 is driven in a rectilinear manner (as is well known in the art) to cause the film to be intermittently advanced one frame at a time through gate 30. Assuming that the claw pulls film from the right side of the film gate, the tension force $T_1$ in the low-tension side of the film between the gate and capstan 32 is increased, and this increase is amplified (to some extent) by the resulting upward movement of roller 64 against the bias of spring arm 62. This increases the tension in the portion of the film wrapped around pulley 42, thereby increasing the driving force applied by the pulley to the film. The capstan pulley then pulls film from the loop of film around the roller 52, thereby causing deflection of the roller from its solid line position toward its dotted line position against the biasing force of arm 54. The increased driving force of the capstan coupled with the increased tension force applied to the film high-tension side by virtue of the deflection of arm 54 causes film to be withdrawn from the supply reel 22 against the tendency or friction drive applied through the spindle 26. This increases the length of film between the supply reel and the gate, and permits rollers 52 and 64 to return toward their solid line positions under the influence of the respective spring arms that support them. This, in turn, reduces the radial pressure of the film against the capstan pulley to reduce the driving force applied by the capstan to the film. The various forces acting on the film tend to produce automatically an equilibrium situation or condition wherein the driving force applied to the film by the capstan substantially equals the opposing forces acting on the length of film between the gate and the supply reel, and such film length becomes substantially stationary.

As the claw 36 delivers film from the gate toward takeup reel 24, the tension force $T_1$ in the film segment between the gate and the takeup reel initially is reduced, and there is a corresponding reduction in the driving force applied by capstan 34 to the film portion wrapped around the capstan and between the capstan and reel 24. The tendency drive applied through spindle 28 to reel 24 then becomes effective to pull additional film around capstan 34 and onto the takeup reel, thus permitting some rotation of the takeup reel in the direction shown in FIG. 1. Here, again, the forces acting on the segment of film between the gate and the takeup reel soon produce an equilibrium situation or condition wherein the driving force applied to the film by capstan 34 is effectively opposed by the force applied to the film through the tendency drive acting on spindle 28.

Because the film-handling elements of the projector as described hereinbefore are substantially symmetrical with respect to the film gate 30, reverse projection of the film from reel 24 to reel 22 is the same as described hereinbefore except, of course, that the film is driven by the claw in the opposite direction. Also, because the capstans 32 and 34 are always driven in a direction to feed film toward gate 30, and because they are effective to maintain a very low tension in those segments of the film between the gate and each capstan, the claw must overcome only a very low-tension force. As a result, film damage is minimized. Also, the portion of the film in film gate 30 is substantially isolated from the tendency drives and external factors (other than claw 36) that otherwise tend to move film in the gate so that a steadier projected image is obtained. In addition, the low-tension forces encountered by claw 36 permits the projector to be switched instantaneously from forward to reverse modes of operation without film damage even at very high rates of projection, e.g., 54 frames per second.

A capstan drive for webs (such as previously described) that is continuously driven at a peripheral speed higher than the web speed so that continuous slippage occurs comprises a web tension amplifier. As previously described, such may be used in a feedback or servocontrol-type mechanism for automatically maintaining a low-tension loop of film adjacent to a film gate, for controlling tension of the film at the gate, etc., even when relatively large static and dynamic tension forces and tension force variations are encountered. The difference in the tension forces on the web portions at opposite sides of a capstan is absorbed by the capstan. The web tension force differences that are absorbed by the capstan can be controlled by adjusting one or combinations of several variable factors that affect operation, including, inter alia, adjusting the actual tension force applied to a web strand adjacent the capstan, changing the radial force between the web and the capstan at some point within the wrap angle of the web about the capstan, modifying the extent of the wrap angle by increasing or decreasing the extent of the contact between the web and the capstan drive member, and by making adjustments or changes that vary the effective coefficient of friction between the capstan and the web. Mechanisms or devices will now be described for controlling the capstan drive (and thus the size and tension in the film loop adjacent the film gate) by regulating these various factors.

Figure 3:
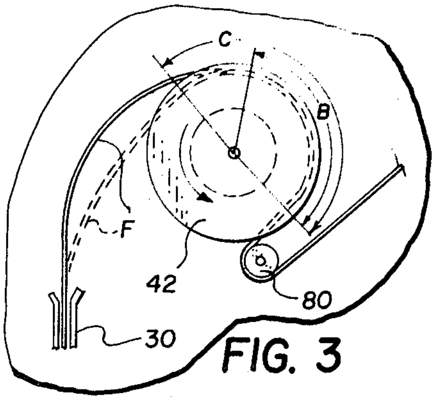
FIGS. 3–7 illustrate preferred embodiments of means for controlling the driving force between a capstan drive member and a web portion wrapped therearound.

FIG. 3 illustrates one mechanism for controlling the capstan drive by varying the extent of the wrap angle. In FIG. 3 the loop sensing means 60 is omitted and capstan pulley 42 is located with respect to gate 30 so that operation of the claw to advance film through the gate directly changes the angular extent that the film is wrapped around capstan pulley 42, thereby varying the wrap from an initial angle B before the claw moves film through the gate (wherein the mechanism is in its equilibrium condition) to an angle C after the claw advances the film through the gate. This increase in the wrap angle increases the gain or amplification of the mechanism, and the increased tension in the high-tension side of the film by the capstan causes additional film to be fed by the capstan from the supply reel toward the gate until the wrap angle is reduced from angle C to angle B. A film guide roller 80 may be provided beside the capstan and at the opposite side thereof from gate 30 in the manner shown in FIG. 3. The location of guide roller 80 determines a fixed point relative to the axis of rotation of member 42 at which the film begins its wrap around the capstan at he high-tension side of the capstan, i.e., toward the film supply (or the film takeup). If there is an increase in tension in the web portion between roller 80 and the film supply when the mechanism is otherwise in its equilibrium condition, the film can slip around the pulley 42 from the low-tension side toward the high-tension side. This increases the wrap angle, thereby increasing the drive applied by the capstan to the film until the equilibrium condition is restored. However, if the wrap angle becomes less than angle B (as occurs, for example, when film is fed by the claw from gate 30 toward capstan 42), then the tendency drive on the reel spindle takes up film from around the pulley to increase the wrap angle until the equilibrium condition is restored.

Figure 4:
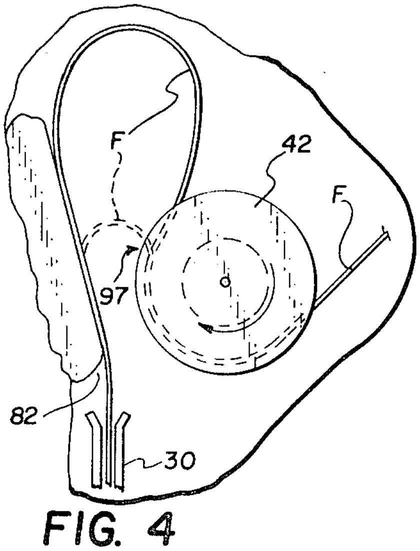
Figure 5:
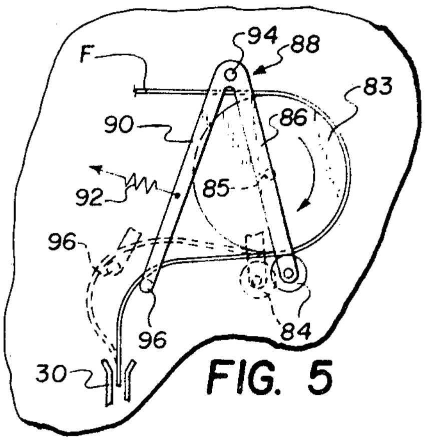
Figures 6, 7, 8:
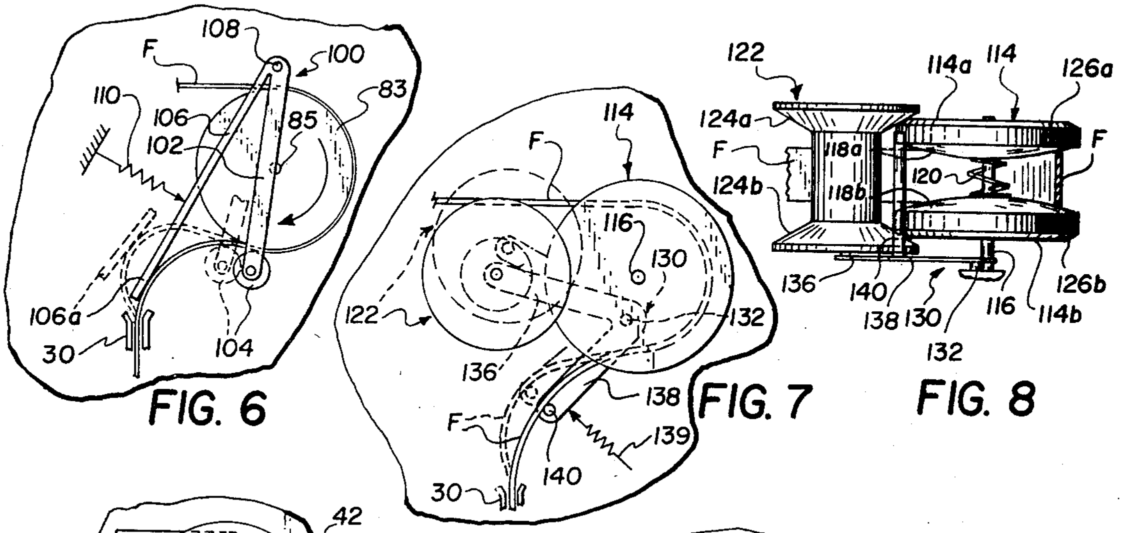
FIG. 8 is an elevation view of the apparatus shown in FIG. 7.

FIGS. 4–6 illustrate mechanisms for effecting control of the capstan drive by changing the radial force or pressure between the film and the capstan. In the embodiment shown in FIG. 4, part of the film loop between capstan 42 and gate 30 engages a stationary wall or guide 82 defining one side of the film path. The wall is located with respect to the capstan and the gate so that the film forms a loop that partially engages wall 82 as shown in the drawings; however, the inherent stiffness of the film resists bending of the film into the loop, and the stiffness of the film causes the film to react from the wall and against the capstan pulley with a force that is inversely proportional to the size of the loop.

Under conditions of equilibrium, the film loop between the capstan and the gate is a relatively large loop as shown in solid lines and the force exerted by the film against the capstan is small. When the claw advances film through the gate, the loop becomes smaller (as shown in dashed lines) and the film reacts from wall 82 against the capstan with greater pressure in the area designated 97, thereby increasing the effectiveness of the friction drive between the capstan and the film. As previously indicated, the capstan maintains a constant ratio $T_1/T_2$ in the film portions adjacent the capstan. As the film loop becomes smaller friction between the film and the capstan causes an increase in the tension force in the low-tension side of the film, and the capstan immediately increases the tension force in the high-tension side of the film, thereby pulling additional film from the reel and restoring the film loop to the larger size loop shown in solid lines. If the claw drives film from the gate toward capstan 42, the resulting increase in the film loop decreases the radial pressure exerted against the pulley by the film, thus reducing the driving force exerted on the film by the capstan. Film can then be pulled around the capstan toward the film reel.

In the embodiment shown in FIG. 5 the capstan drive member is shown as a substantially cylindrical force capstan 83 rotatable about an axis 85. A pinch roller 84 is mounted at an end of one arm 86 of a substantially V-shaped lever generally designated 88. The lever 88 is mounted for movement about a pivot 94 located at the intersection of arm 86 and a second lever arm 90. Pivot 94 is offset from the axis 85 so that roller 84 is movable toward and away from pulley 83. Pivot 94 is located so that the pinch roller touches capstan 83 before a line between pivot 94 and the axis of rotation of roller 84 crosses axis 85. The lever is spring biased as shown diagrammatically at 92, and spring 92 urges pinch roller 84 away from capstan 83. The end of arm 90 opposite from pivot 94 has a projecting finger 96 around which film F is looped between capstan 83 and gate 30 so that the finger engages the inside surface of the film loop. The film also passes between capstan 23 and pinch roller 84. The construction and mounting of the various parts is such that operation of the claw to advance film through the gate and away from the capstan reduces the size of the film loop about finger 96, thereby moving the finger and arm 90 from the position shown in dashed lines to the position shown in solid lines. This swings lever 88 about pivot 94 to force pinch roller 84 against the film and thus urge the film against the capstan with an increased radial force or pressure. This increase in pressure increases the effectiveness of the drive imparted by the capstan to the film, thereby driving additional film from the supply reel into the loop about finger 96. Spring 92 then swings lever 88 back to the left to restore the film loop to its dashed line position and move pinch roller 84 away from the capstan pulley. The drive mechanism then returns to its equilibrium condition until the claw again reduces the size of the film loop about the finger 96. Thus finger 96 comprises loop sensing means responsive to the size of the film loop for regulating the drive between the capstan and the film.

FIG. 6 shows an embodiment similar to FIG. 5. A generally V-shaped lever designated 100 has an arm 102 that carries a pinch roller 104. Another arm 106 of the lever has an end portion designated 106*a* located with respect to the film path so that film driven toward the film gate by capstan 83 forms a loop that engages the portion 106*a* and urges it (and thus the entire lever) to the left or clockwise about a pivot 108 and against the biasing force of a spring 110 that urges the lever counterclockwise. As film is pulled from the loop and through the gate by the claw, the size of the loop is reduced from the size shown in dashed lines to the size of the loop shown in solid lines. Lever arm 106 follows the outer surface of the film loop due to the biasing force of spring 110 and pinch roller 104 forces the film F against the capstan, thereby increasing the radial pressure between the film and the capstan and increasing the effectiveness of the capstan drive. The result is that additional film is fed from the supply roll into the loop adjacent gate 30. As this occurs, the film engages and pushes the lever arm 106 back to its dotted line position, thereby moving pinch roller 104 away from the capstan. The system then returns to its equilibrium condition. Arm portion 106*a* comprises loop sensing means that controls the advance of film in response to the size of the film loop between the capstan and the gate.

FIGS. 7 and 8 illustrate means for controlling the size of the loop at the gate by regulating the effective coefficient of friction between the capstan and the film. In this embodiment the capstan drive member is generally designated 114 and it comprises two separate but substantially identical capstan parts 114*a* and 114*b* that are mounted for rotation on a common shaft 116. Parts 114*a* and 114*b* have tapered drive surfaces 118*a* and 118*b* facing each other. These tapered surfaces are substantially the mirror images of each other, and they are spherical and have their centers of curvature located along the axis of shaft 116. The film F engages the surfaces 118*a* and 118*b* as illustrated in FIG. 8 in much the same manner as described previously in connection with FIG. 2. Parts 114*a* and 114*b* are urged away from each other by a spring 120 coiled around shaft 116 between surfaces 118*a* and 118*b*; however, parts 114*a* and 114*b* can be moved toward each other against the biasing force of spring 120 to vary the spacing between the film contacting surfaces 118*a* and 118*b*.

A generally spool-shaped pinch roller 122 comprises oppositely disposed frustoconical drive surfaces 124*a* and 124*b* that are adapted to engage suitable tapered surfaces 126*a* and 126*b* at the outer edge portions of capstan parts 114*a* and 114*b*. As is apparent from FIG. 8, movement of roller 122 with respect to capstan member 114 controls the extent of separation of the film engaging surfaces 118*a* and 118*b*. The effective coefficient of friction between the drive surfaces and film F can be varied by changing the separation between surfaces 118*a* and 118*b* because (1) the coefficient of friction is a function of the particular angle at which the film contacts spherical surfaces 118*a* and 118*b* (as noted before in connection with FIG. 2), and (2) this angle varies when parts 114*a* and 114*b* are moved toward or away from each other due to the curvature of the surfaces. Since a particular filmstrip has a constant width, this angle of contact is changed by moving the parts 114*a* and 114*b* toward or away from each other by movement of the pinch roller. Thus as roller 122 is moved to the right or toward shaft 116, the interaction between surfaces 124*a*, 124*b* on the pinch roller and the surfaces 126*a*, 126*b* on the capstan member moves drive surfaces 118*a* and 118*b* toward each other. The film then contacts the drive surfaces nearer their radially outer edges where the angle of contact is greater. Therefore the effective coefficient of friction is less, and the drive force exerted by the capstan is less. While this also changes the radius at which the film contacts the capstan drive surfaces, this is not detrimental provided the capstan is rotated at a speed that ensures slippage between the capstan and the film at all times.

Means are provided for adjusting the separation between the surfaces 118*a*, 118*b* automatically in response to fluctuations in the tension forces in the low-tension side of the film. The adjusting means shown comprises a generally V-shaped lever 130 mounted for movement about a pivot 132 that extends through the lever at the intersection at its arms 136 and 138. Pivot 132 is offset from the axis of shaft 116 as shown in FIG. 7. Pinch roller 122 is mounted at the outer end of arm 136 and a film-guiding finger 140 projects from the outer end of arm 138. The pinch roller and lever are biased toward their dashed line positions by a spring diagrammatically shown at 139. Film between the capstan and gate 30 is looped around finger 140 so that the finger senses a change in the size of the film loop adjacent the gate in response to operation of the claw for advancing film through the gate. The lever 130 pivots between its solid and dashed line positions in response to changes in the size of the loop. This in turn moves the pinch roller with respect to capstan member 114, thereby to vary the spacing between the film driving surfaces 118*a* and 118*b* automatically in response to tension forces that are sensed by the finger 140. Thus finger 140 and the lever 130 comprise web tension sensing means that are coupled to the roller for effecting movement of the roller into and out of engagement with rotatable members 114*a* and 114*b* directly in response to changes in tension forces in the low-tension portion of the web between the capstan and the gate.

Figures 9, 10:
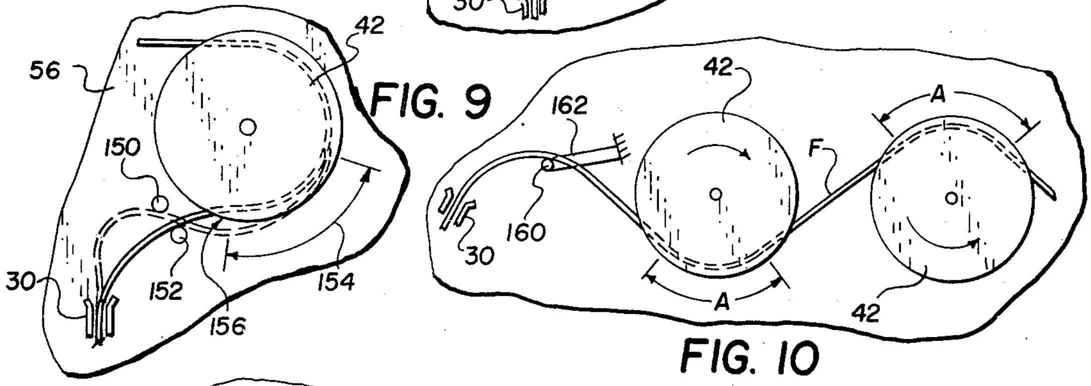
FIGS. 9–13 illustrate still further preferred embodiments of apparatus for controlling the driving connection between the capstan drive member and a web.

FIG. 9 illustrates apparatus for controlling the size of the loop of film at the gate by (1) regulating the extent of the wrap angle of the film about the capstan, and (2) by varying the pressure of engagement between the capstan and the film. In this embodiment of the invention a pair of posts 150 and 152 are mounted on the plate 56 in spaced relation to each other and at opposite sides of the film path between capstan roller 42 and film gate 30 so that film F passes between the two posts. When the mechanism is in its equilibrium condition, the film is driven by capstan pulley 42 into a large loop and the film engages post 150 which acts as a fulcrum and causes the film to pivot about the post substantially into the shape or configuration shown in dotted lines. This reduces both the total wrap angle and the radial pressure of the film against the pulley. When the film is pulled through the gate 30 to reduce the size of the film loop, the film loop then assumes the position shown in solid lines in FIG. 9 wherein it engages post 152. This post then acts as a fulcrum and the film pivots about it into the solid line position. As will be seen from a comparison of the solid line and dotted line positions of the film in FIG. 9, advance of film through the gate increases the wrap angle by an amount shown at 154 and, as the loop becomes smaller and the film pivots about post 152, the stiffness of the film produces an increase in the radial pressure of the film against the capstan at the point designated 156. Thus the FIG. 9 embodiment of the capstan drive mechanism has two variables that change in response to a change in the film loop between the capstan and the gate caused by advancing of film through the gate.

FIG. 10 illustrates two capstan drive members 42 located along the film path with the film being trained or wrapped around a portion of each pulley, the extent of the wrap around each member 42 being illustrated by the angle A. The portion of the film between gate 30 and the adjacent member 42 may be trained around a suitable guide member 160 supported from an arm 162. While only two pulleys 42 have been shown in FIG. 10, additional pulleys can be provided in series or "-cascaded," if desired. For any particular mechanism, the total effective wrap angle of the film around a series of capstan pulleys is the summation of the wrap angle A for each of the pulleys. Thus by using an appropriate number of capstans in series the total gain or tension ratio ($T_1/T_2$) can be quite high for the system taken as a whole.

Figure 11:
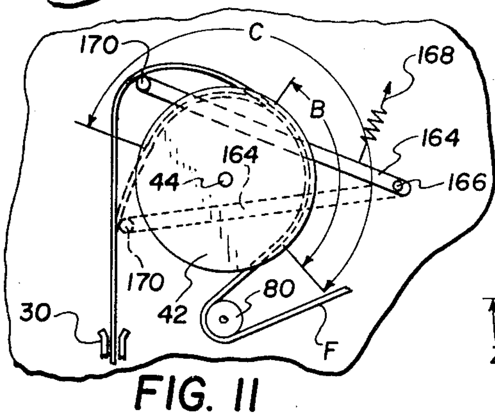

FIG. 11 illustrates an embodiment of the invention that is a modification of the apparatus illustrated in FIG. 3 and wherein the same reference numerals are used to indicate the same or similar parts. In this embodiment, however, an arm 164 is provided and is pivoted at one end as shown at 166. The arm is biased in a clockwise direction by a spring force diagrammatically shown at 168. This spring force can be provided by making the arm 164 of a spring material and rigidly attaching the arm at point 166 to a suitable support. At the other end of arm 164 there is a film-guiding member shown in the form of finger 170, the finger being located with respect to the capstan pulley 42 to engage film between the capstan pulley and film gate 30 and thereby sense the size of the loop. In this embodiment the capstan driving force is determined by the change in the wrap angle (e.g., between angle B and angle C), and by the change in the tension force $T_1$ in the low-tension side of the film (i.e., the part of the film between the capstan and the gate) resulting from operation of the claw and the spring 168. Thus as the wrap angle changes from angle B to angle C in response to operation of the pulldown claw to advance film through the gate 30, the spring force 168 increases the tension force in the low-tension side of the capstan, and both of these changes increase the driving force exerted on the film by the capstan. When the capstan restores the film loop between the capstan and the gate, spring force 168 returns arm 164 to the position shown in solid lines and the wrap angle decreases from angle C to angle B, thereby returning the apparatus to its equilibrium condition.

Figure 2:
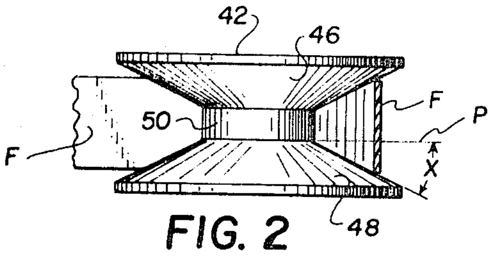
FIG. 2 is an elevation view of a capstan drive member of the invention used in the projector shown in FIG. 1.
Figure 12:
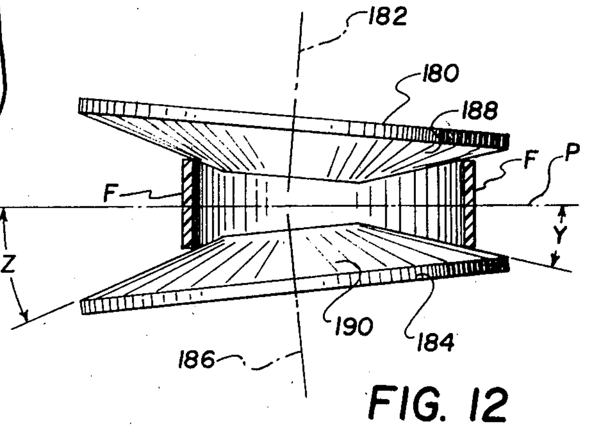

As previously noted in connection with FIG. 2, the effective coefficient of friction between a capstan drive member and the film can be regulated by control of the angle X defined by the tapered driving surfaces of the capstan drive member and a plane P perpendicular to the plane of the film. FIG. 12 of the drawings shows a capstan pulley configuration utilizing this principle for regulating the coefficient of friction and the gain of the capstan drive. In FIG. 12 a first capstan drive member 180 is mounted by suitable means (not shown) for rotation about an axis 182. A second and similar capstan drive member 184 is mounted for rotation about an axis 186 that is nonparallel to axis 182. In other words, members 180 and 184 are positioned in skewed relation with respect to each other. Members 180 and 184 have substantially frustoconical surfaces 188 and 190 generated about axes 182 and 186, respectively, and surfaces 188, 190 are positioned in facing relation and in mirror image relation with respect to each other so that the film F is adapted to engage these surfaces and to be driven by the members during their rotation about their respective axes. Because of the skewed relation of parts 180 and 184, surfaces 188 and 190 each define an angle Y with respect to a plane P perpendicular to film F at one side of these respective axes and a second angle Z with respect to such plane at the opposite side of the axes of rotation. As previously noted in connection with FIG. 2 the size of the angles Y and Z determine (in part) the effective coefficient of friction between the film and surfaces 188 and 190 with relatively large angles decreasing the driving force exerted by the capstan on the film and with relatively small angles increasing the driving force exerted by the capstan on the film. Thus by proper positioning and mounting of members 180 and 184 the relative driving forces acting on the low-tension and high-tension sides of the filmstrip wrapped around the capstan drive members can be regulated. Thus a large angle Z on the high-tension side of the capstan will permit relatively high-tension forces to be more easily handled without buckling of the film while a relatively small flange angle Y on the low-tension side will provide comparatively high gain for the capstan drive. The construction of the capstan shown in FIG. 12 provides more uniform web tension distribution within the wrap angle of the film around the capstan.

Figure 13:
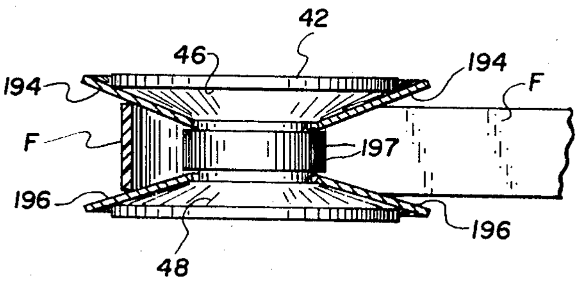

FIG. 13 illustrates an embodiment of the invention that reduces the possibility of wear occurring on the side edges of the film due to slippage between the capstan drive surfaces and the edges of the film, and it also eliminates "squeaking" of the film due to such slippage. In FIG. 13 a pair of thin, flexible, frustoconical or dish-shaped members 194 and 196 are interposed between the frustoconical capstan drive surfaces 46 and 48 of pulley 42 and the film F. Annular grooves 197 are provided in the face of the central portion of the capstan for receiving the inner portions of members 194, 196, thereby retaining such members against movement toward each other. Pulley 42 can be made in sections to facilitate assembly of the members 194, 196 onto the capstan. The members 194 and 196 can be fabricated from a fibrous material (such as paper or a textile material) impregnated with a binder, or from other suitable materials. The coefficient of friction between the film F and the members 194 and 196 is higher than the coefficient of friction between capstan drive surfaces 46 and 48 and the members 194 and 196. Therefore, when the capstan is driven at a speed that exceeds the speed of the film, slippage takes place between members 194, 196 and surfaces 46, 48 rather than between the film and members 194, 196. Thus any wear resulting from friction occurs on surfaces 46 and 48 or on the surfaces of members 194 and 196 that contact such surfaces rather than on the edges of the film. Members 194, 196 provides a friction drive between the capstan member 42 and the film.

Each of the embodiments of the invention disclosed in FIGS. 2–13 may be incorporated in a projector mechanism such as disclosed in FIG. 1 on either one or both sides of the film gate, and, if desired, one capstan embodiment as disclosed in one of FIGS. 2–13 may be used on one side of the gate while another such embodiment may be used on the other side of the gate. In the preceding detailed description of the various embodiments of the capstan drives, the operation of the capstan drives have been described primarily in regard to their use for advancing film around a capstan and toward a gate 30; however, in each instance they are equally suitable for use between the gate and a take up mechanism since they function to maintain a particular $T_1/T_2$ ratio irregardless of the actual direction of film movement around the capstan at any particular instant. Also, while the invention is particularly suited for use with film transport mechanisms; such as in motion picture projectors, it will be understood that the various embodiments of the invention are equally suitable for use in other web-handling apparatus, including tape recorders and playback mechanisms, computer tape handling apparatus, and other web transport devices.

The invention has been described in detail with particular reference to preferred embodiments thereof, but it will be understood that variations and modifications can be effected within the spirit and scope of the invention.

We claim:

1. In web-handling apparatus for moving a length of a web having spaced edge portions past a station along a web path between a web supply and a web takeup, the apparatus having a drive member along the web path for advancing the web past the station, the improvement comprising:

two capstan drive means mounted along said web path and positioned at opposite sides of said drive member, each of said drive means comprising a rotatable member engageable with the web for driving the web along the web path, and means coupled to each of said rotatable members for rotating each of said rotatable members in a direction for driving a web portion toward the station.

2. In web-handling apparatus as set forth in claim 1 wherein each of said means for rotating said rotatable member, drives such members at a speed that exceeds the maximum speed the web is advanced by said drive member whereby during operation each of said members (1) tends to form a low-tension loop of web material between the station and such member and (2) tends to maintain a substantially constant mathematical relation between the tension forces in said loop and in the portion of the web at the other side of such member, and said apparatus further comprising web sensing means along the web path between the station and each of said rotatable members, each of said web sensing means having means engageable with said web loops, and means urging such loop engageable means toward the web.

3. In web-handling apparatus as set forth in claim 1 wherein said rotatable member of each of said capstan drive means comprises two spaced oppositely tapered frustoconical drive surfaces, portions of the web being adapted to be partially wrapped around each of said rotatable members, said surfaces being engageable with the side edge portions of the web for effecting driving contact between the web and the surfaces.

4. In web tension handling apparatus as set forth in claim 1 wherein the web is wrapped around each rotatable member and is in contact with an angular portion of each rotatable member, the apparatus further comprising:

guide means along the web path between the web supply, the web takeup and each of the capstan drive means for guiding the web into contact with each of said rotatable members at a fixed location relative to the axis of rotation of said rotatable members, thereby determining one end point of the angular extent of the contact between the web and each rotatable member; and the rotatable member of each capstan drive means is located with respect to the station so that operation of the drive member for advancing the web past the station changes the location with respect to the axis of rotation of said rotatable members of the other end point of the angular extent of the contact between the web and each such rotatable member, thereby changing the total angular extent of contact between the web and said rotatable members.

5. In web-handling apparatus as set forth in claim 1 wherein the web forms a loop between each capstan drive means and the station, and further comprising means along the film path and adjacent to each capstan drive means for controlling the pressure of engagement between the web and the respective rotatable member at a point within the area of contact between the web and the respective rotatable member in response to variations in the size of the loop.

6. In web-handling apparatus as set forth in claim 5 wherein said apparatus comprises web guide means positioned between each of said capstan drive means, and the station so that the web portion forming the loop reacts from the guide means against the capstan drive means with a pressure that is a function of the size of the loop.

7. In web-handling apparatus as set forth in claim 6 wherein each of said web guide means comprises at least one post positioned at one side of the web path so that the web can engage and pivot about said post for controlling the pressure of engagement between the web and the rotatable members.

8. In web-handling apparatus as set forth in claim 5 wherein each of said means for controlling the pressure of engagement between the web and the respective rotatable member comprises:

a pinch roller engageable with a portion of the web in contact with said rotatable member, means mounting said pinch roller for movement toward and away from said rotatable member thereby to vary the pressure of engagement between the web and the rotatable member, and web loop sensing means positioned along the web path between said rotatable member and the station for sensing the size of the web loop between the rotatable member and the station, and means coupling said web sensing means to said means mounting said pinch roller for moving said roller away from said rotatable member in response to an increase in the size of said loop and for moving said roller toward said rotatable member in response to a decrease in the size of said loop.

9. In web-handling apparatus as set forth in claim 1 wherein each of said rotatable members comprises two separate parts with each of said parts having a spherical drive surface thereon positioned in mirror image relation to the drive surface of the other part of said member, each of said parts being rotatable about an axis extending through the center of curvature of its respective spherical surface, said surfaces being engageable with the side edge portions of the web for effecting driving contact between the web and the surfaces, means mounting said parts of each member for movement toward and away from each other along their respective axes of rotation, thereby to vary the spacing between said surfaces, and means adjacent each of said capstan drive means and responsive to tension forces acting on the web adjacent each of said rotatable members for urging said parts of said member toward and away from each other, thereby to change the radial location along said surfaces where said surfaces contact the side edge portions of the web and simultaneously change the angle defined by a tangent to said surfaces where they contact the web and a plane through the web along the length of web in contact with said surfaces.

10. In web-handling apparatus as set forth in claim 9 wherein each of said means for urging said parts toward and away from each other comprises:

a spring biasing said surfaces of said parts away from each other, a pinch roller having portions simultaneously engageable with both of said parts and operable when moved toward said parts to urge said surfaces toward each other against the biasing force of said spring, and means coupled to said roller for (1) sensing changes in tension forces in a portion of the web adjacent the respective capstan drive means, and (2) effecting movement of said roller toward and away from said parts of said rotatable member in response to sensing of such tension forces.

11. In web-handling apparatus as set forth in claim 10 wherein each of said means coupled to said roller comprises:

a lever having two arms and being pivotal about an axis through the intersection of said arms, said roller being supported by one of said arms, and a finger carried by the other of said arms and positioned along the web path for engagement by the web so that movement of the web will pivot the lever and thereby move the roller.

12. In web-handling apparatus as set forth in claim 1 further comprising means located along the web path and adjacent to each capstan drive means for changing the angular extent that the web is wrapped around the respective rotatable member in response to movement of the web by the drive member.

13. In web-handling apparatus as set forth in claim 12 wherein said means adjacent to each capstan drive means for changing the angular extent that the web is wrapped around the respective rotatable member comprises a pair of posts positioned at opposite sides of the web path and in spaced relation to each other so that the web can pivot about one post or the other in response to tension forces in the length of web between the capstan drive means and the station.

14. In web-handling apparatus as set forth in claim 12 wherein said means adjacent to each capstan drive means for changing the angular extent that the web is wrapped around the respective rotatable member comprises: web loop sensing means engageable with a portion of the web between said member and said station, means mounting said sensing means for movement between a first position wherein part of the web is lifted by said sensing means from engagement with a first angular portion of said rotatable member and a second position wherein the web is engageable with said angular portion of said rotatable member, and means biasing said sensing means toward said first position.

15. In web-handling apparatus as set forth in claim 1 wherein each of the capstan drive means comprises a plurality of rotatable drive members located along the web path and with respect to each other so that the web is partially wrapped around successive rotatable members.

16. In web-handling apparatus as set forth in claim 1 wherein each of said rotatable members comprises a thin frustoconical member, and each of said capstan drive means further comprises friction drive means for each of said members.

17. Web-handling apparatus for moving a length of flexible web material along a web path, the apparatus comprising:

a rotatable member positioned along the web path and having a substantially annular web-engaging surface, a portion of the web along the web path being wrapped around said member and being in contact with an angular portion of said surface;

means coupled to said member for rotating said member about an axis, thereby (1) urging the web around said member and along the path, and (2) tending to form a low-tension loop in a portion of the web at one side of the member and maintaining a comparably high-tension force in a portion of the web at the other side of the member; and means located along the web path adjacent to said member and adjacent to the loop in the web for controlling the radial force between the web and the rotatable member at a point where the web contacts said surface, said last-mentioned means comprising web guide means along the web path engageable by a portion of the web forming the low-tension loop, the web guide means being positioned relative to the rotatable member so that the web portion forming the loop reacts from the guide means against the rotatable member with a pressure that is a function of size of the loop.

18. Web-handling apparatus for moving a length of flexible web material along a web path, the apparatus comprising:

two rotatable web-engaging members, each of said members having a substantially spherical web-engaging drive surface thereon;

means mounting said members with said surfaces positioned in facing and mirror image relation to each other for rotation of said members about a common axis passing through the center of curvature of each of said surfaces, said mounting means mounting said members for movement of said members along said axis toward and away from each other, thereby to vary the spacing between said surfaces;

means coupled to said members for biasing said surfaces away from each other;

a pinch roller having oppositely tapered frustoconical portions simultaneously engageable with each of said members and (1) being operable when moved toward said members to urge said surfaces toward each other against the biasing force of said biasing means and (2) being operable when moved away from said members for permitting separation of said surfaces by said biasing means; and means coupled to said roller for (1) sensing changes in the tension force in a portion of the web adjacent said members, and (2) effecting movement of said roller toward and away from said members in response to sensing of such changes in tension force.

19. Web-handling apparatus as set forth in claim 18 wherein said means coupled to said roller comprises a generally V-shaped lever having two arms, means mounting said lever for pivotal movement about an axis, said pinch roller being carried by one of said arms, and web-engaging means carried by the other of said arms and positioned along the web path for engagement with the web.

20. Web-handling apparatus for moving a length of flexible web material along a web path, the apparatus comprising:

a rotatable member positioned along the web path and having a web-engaging surface, a portion of the web along the web path being wrapped around said member and being in contact with an angular portion of said surface;

means coupled to said member for rotating said member about an axis, thereby (1) urging the web around said member and along the path, and (2) tending to form a low-tension loop in a portion of the web at one side of the member and maintaining a comparatively high-tension force in a portion of the web at the other side of the member; and means located along the web path and adjacent to said rotatable member for changing the angular extent that the web is wrapped around the rotatable member in response to a change in the size of the low-tension loop in the web.

21. Web-handling apparatus as set forth in claim 20 wherein said means for changing the angular extend that the web is wrapped around the rotatable member comprises a pair of posts positioned at opposite sides of the web path and in spaced relation to each other so that the web can pivot about one post or the other in response to changes in the size of the loop in the web.

22. Web-handling apparatus as set forth in claim 20 wherein said means for changing the angular extent that the web is wrapped around the rotatable member comprises web loop sensing means engageable with the web loop, means mounting said sensing means for movement between (1) a first position wherein part of the web defining the loop is lifted by said sensing means from engagement with a first angular portion of said rotatable member and (2) a second position wherein the web is engageable with said angular portion of said rotatable member, and means biasing said sensing means toward said first position.

23. Web-handling apparatus for moving a length of flexible web material along a web path, the apparatus comprising:

rotatable means positioned along the web path and having a pair of facing frustoconical surfaces positioned in mirror image relation to each other; two frustoconical web-engaging members, one of said web-engaging members being positioned in frictional engagement with each of said surfaces of said rotatable means and being movable with respect to said surfaces of said rotatable means; a portion of the web along the web path being wrapped around said web-engaging members and being in contact with portions thereof whereby rotation of said rotatable means provides a friction drive to said web through said web-engaging members; and means coupled to said rotatable means for rotating said means about an axis.

24. Web-handling apparatus for moving a length of flexible web material along a web path, the apparatus comprising:

means positioned along the web path and engageable with the web for intermittently advancing the web along said path;

capstan drive means positioned along the web path for continuously driving the web along the path toward said intermittent drive means, said capstan drive means comprising a pair of tapered frustoconical drive surfaces positioned in substantially mirror image relation with respect to each other, a portion of the web along the web path having side edge in contact with an angular portion of each of said surfaces so that rotation of said surfaces imparts a driving force to said web for advancing said web toward said intermittent drive means, each of said surfaces being rotatable about an axis and said axes being nonparallel with respect to each other.

25. Web-handling apparatus for moving a length of flexible web material along a web path, the apparatus comprising:

a rotatable member positioned along the web path and having a substantially annular web-engaging surface, a portion of the web along the web path being wrapped around said member and being in contact with an annular portion of said surface;

means coupled to said member for rotating said member about an axis, thereby (1) urging the web around said member and along the path, and (2) tending to form a low-tension loop in a portion of the web at one side of the member and maintaining a comparably high-tension force in a portion of the web at the other side of the member; and means locating the web path adjacent to said member and adjacent to the loop in the web for controlling the radial force between the web and the rotatable member at a point where the web contacts said surface, said last-mentioned means comprising a pair of posts positioned at opposite sides of the web path and in spaced relation to each other so that the web can pivot about one of said posts in response to a reduction in the size of the web loop and thereby increase the radial force between the web and said rotatable member.

* * * * *